July 9, 1929.  P. J. COLLINS  1,720,208
DYNAMO ELECTRIC MACHINE
Original Filed Nov. 9, 1923   4 Sheets-Sheet 1

Inventor
P. J. Collins.
By
Attorney

July 9, 1929. P. J. COLLINS 1,720,208
DYNAMO ELECTRIC MACHINE
Original Filed Nov. 9, 1923  4 Sheets-Sheet 4
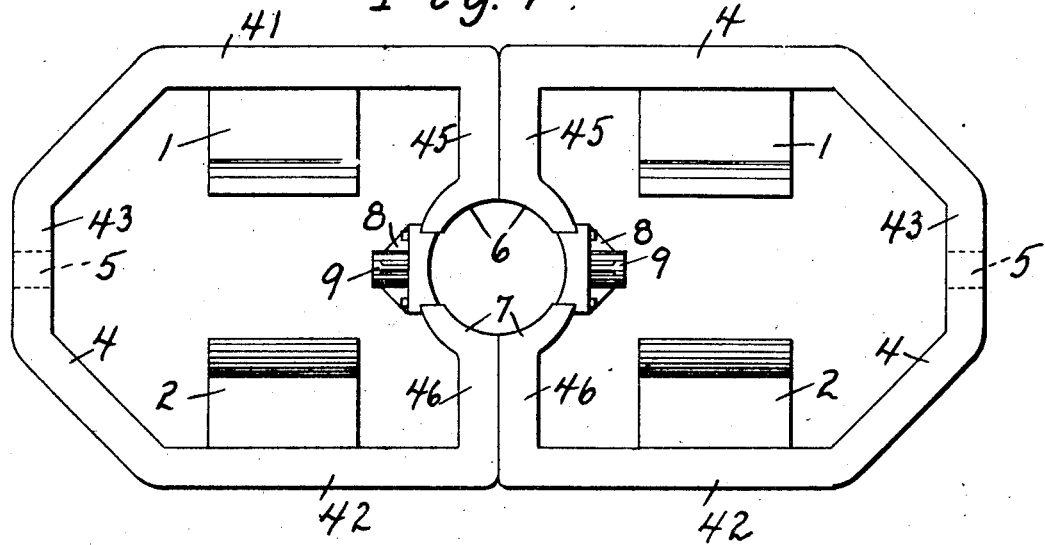
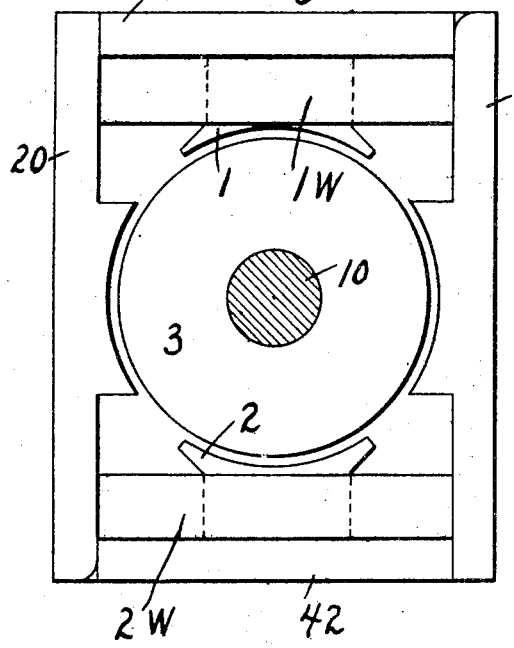 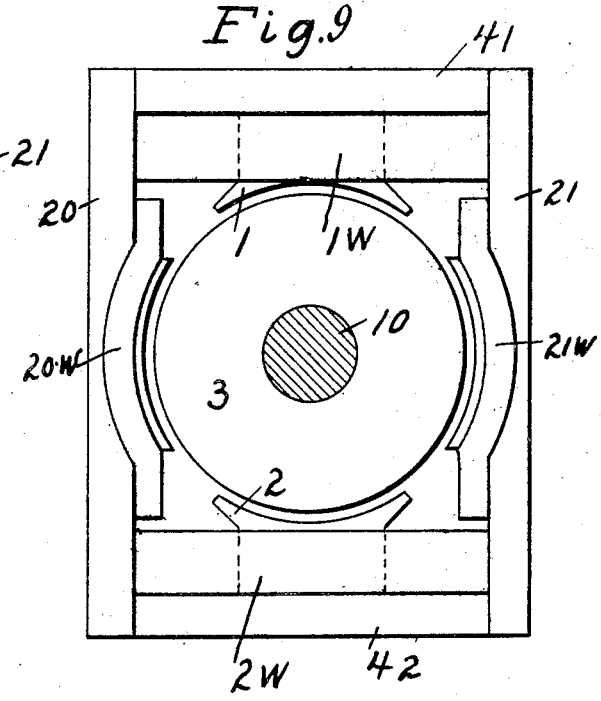
Inventor
P. J. Collins.
By
Attorney Patented July 9, 1929.

1,720,208

UNITED STATES PATENT OFFICE.

PATRICK J. COLLINS, OF SCRANTON, PENNSYLVANIA, ASSIGNOR TO EDWARD B. SCOTT, TRUSTEE, OF SCRANTON, PENNSYLVANIA.

DYNAMO-ELECTRIC MACHINE.

Application filed November 9, 1923, Serial No. 673,835. Renewed July 19, 1928.

My invention relates to dynamo-electric machines and has for its object to provide a device with a single field and a plurality of armatures which will be simple and inexpensive in construction and will be capable of being used as a motor in starting an engine and as a generator to generate different currents which may differ in character, as well as in voltage and quantity and may be independently varied. A further object is to provide a device which will be particularly adapted to be used on motor vehicles to furnish current suitable for lighting or heating and for ignition.

With these and other objects hereinafter described in view, my invention consists in the construction and combination of elements hereinafter described and particularly pointed out in the claims.

Referring to the drawings:

Fig. 7 is a side view of a generator frame arranged for one inductor armature and two main armatures.

Fig. 8 is an end view of a generator whose side plates carry pole pieces.

Fig. 9 shows the same construction shown in Fig. 8 except that the pole pieces on the side plates carry windings.

Figure 1:
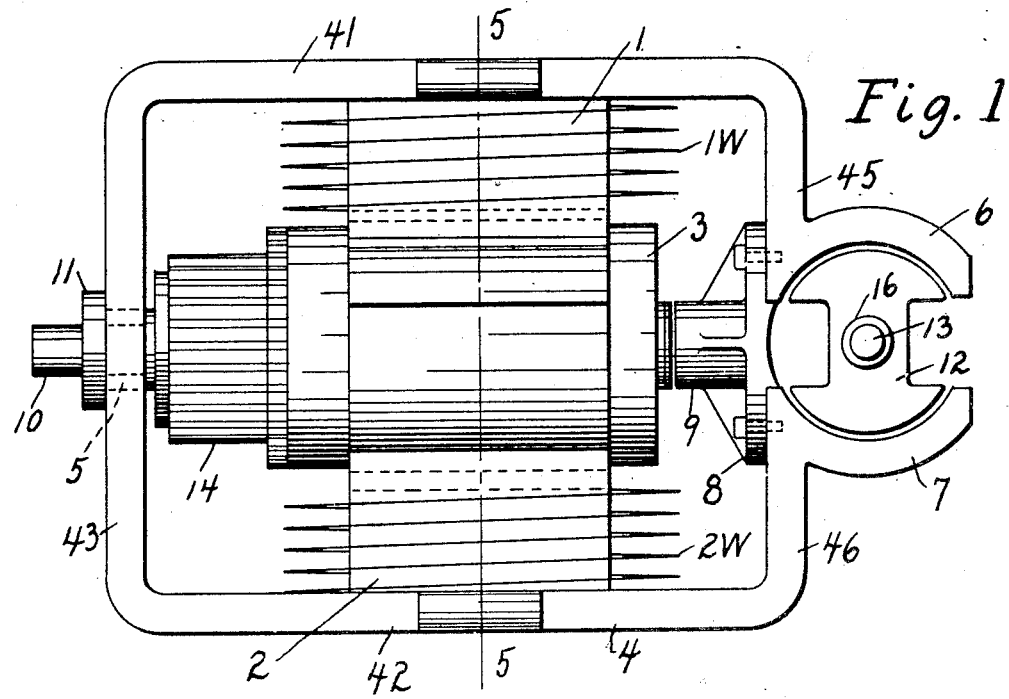
Fig. 1 is a side view of a generator embodying my invention.

In the drawings, 1 and 2 indicate two oppositely placed pole pieces having their adjacent ends suitably formed to receive between them an armature 3. These pole pieces 1 and 2 are provided with windings 1W and 2W of insulated wire of any suitable size and are wound in any usual or known manner. These poles pieces are secured, respectively, at their outer ends to opposite parallel legs 41 and 42 of a yoke 4 which consists of a single strip of magnetic metal such as iron or steel having an opening 5 formed therein midway between its ends in a central portion 43. From the ends of the central portion 43, the legs 41 and 42 extend lengthwise of the generator and parallel with each other. At the ends of the legs opposite the central portions 43, both end portions of the yoke extend inward to form the portions 45 and 46, the inner ends of which are separated by a comparatively small space. From the inner ends of the portions 45 and 46, the ends of the strip from which the yoke is formed extend outward, these ends being curved to form pole pieces 6 and 7 respectively. The inner ends of the portions 45 and 46 are rigidly held in position by a plate 8 secured to their inner faces opposite the central portion 43, the yoke thus forming three sides of an inclosure and the plate 8 with portions 45 and 46 forming the fourth side.

Extending toward the central portion 43 of the plate 8 is a bearing adapted to receive the end of the shaft 10 which carries the armature 3. The other end of the shaft 10 extends through bushing 11 in the opening 5 in the central portion 43 of the yoke.

Between the pole pieces 6 and 7 is arranged an armature 12 carried by the shaft 13.

Figure 2:
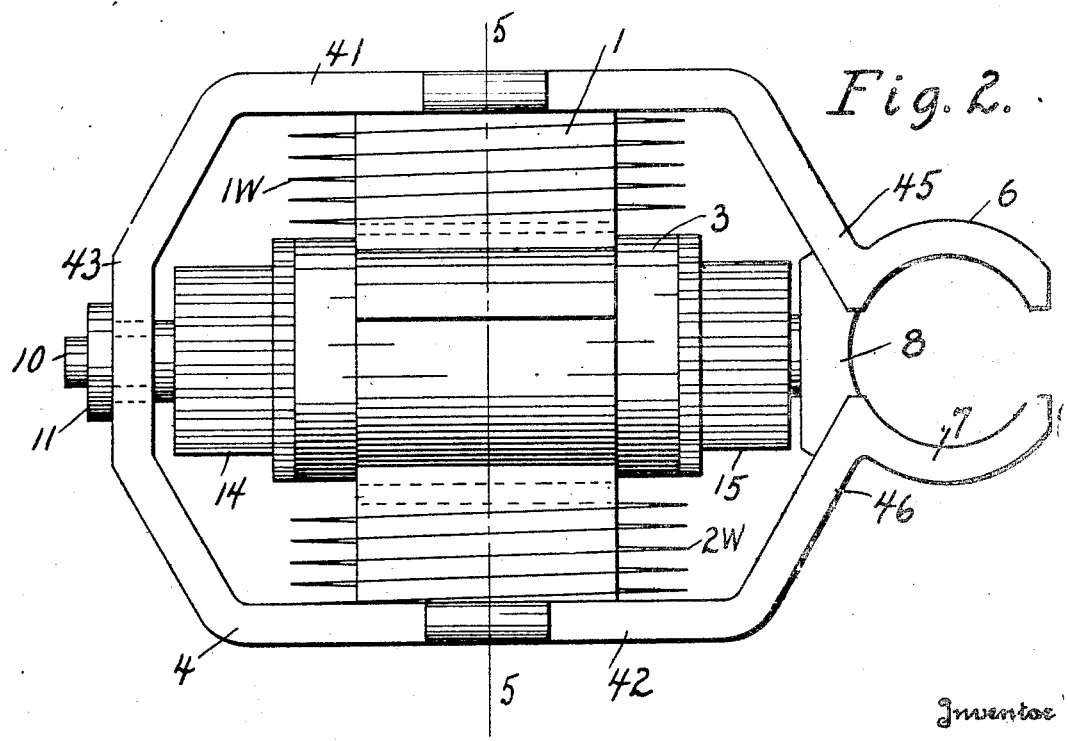
Fig. 2 is a similar view showing a modified form of yoke.

The armature may be wound in any usual or known way and is provided with a commutator 14 at one end, or in case it is provided with a double set of windings, it may also be provided with a commutator 15; the commutators 14 and 15, if two are used, being preferably arranged as shown in Fig. 2 at opposite ends of the armature. In case it is desired to take off an alternating current instead of a direct current from the armature or from one set of windings of the armature, a collector ring will be substituted for the commutators or for one of them. The armature 12 is provided with a collector ring 16 (Fig. 1) in order to take off an alternating current for the purpose of ignition.

The yoke 4 may be formed of a strip of high grade steel so as to be capable of being permanently magnetized and the pole pieces 1 and 2 may also be of steel, though both the yoke 4 and the pole pieces 1 and 2 may be of iron.

In order to produce a machine of the highest possible efficiency when operating as a motor in starting the engine, side plates 20 and 21 are provided as shown in Figs. 4, 5, 6, 11 and 12. These side plates act as auxiliary yokes or magnetic shunts and may be hinged at their ends, though it should be understood that they may be adapted or arranged in any suitable way to complete the magnetic circuit while the machine is operating as a motor. They are shown held away from the main yoke by springs 22 and 23 (Figs. 4 and 5), while the machine is operating as a generator. It should be understood that any suitable means may be employed for holding these plates out of contact with the main yoke.

When the battery current is turned through the machine at starting, the pole pieces 1 and 2 will be strongly magnetized and will cause the side plates 20 and 21 to contact with the main yoke 4, thus producing temporarily a machine of high power. As soon as the machine ceases to operate as a motor and begins to act as a generator, the magnetic force of the pole pieces 1 and 2 is lessened, and the springs 22 and 23 throw the plates 20 and 21 out of contact with the main yoke 4 and break the short magnetic circuit. It should be understood that any of the various known means employed for operating switches for starting the motor may be used for making and breaking the magnetic circuit.

Figure 3:
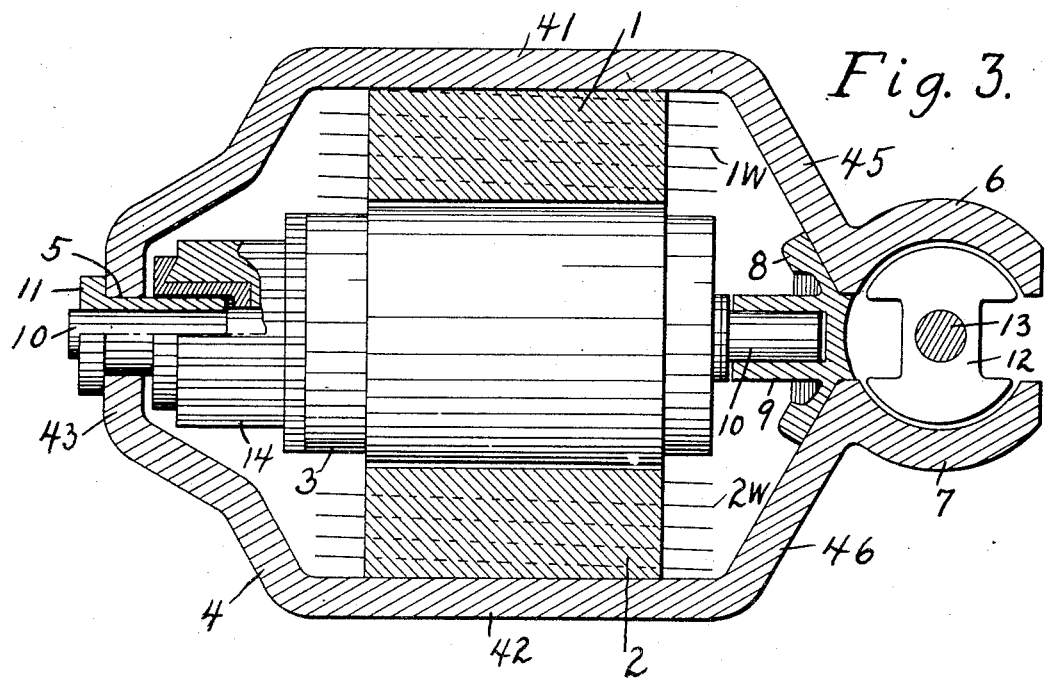
Fig. 3 is a vertical central longtudinal sectional view of another generator similar to the first two.
Figure 4:
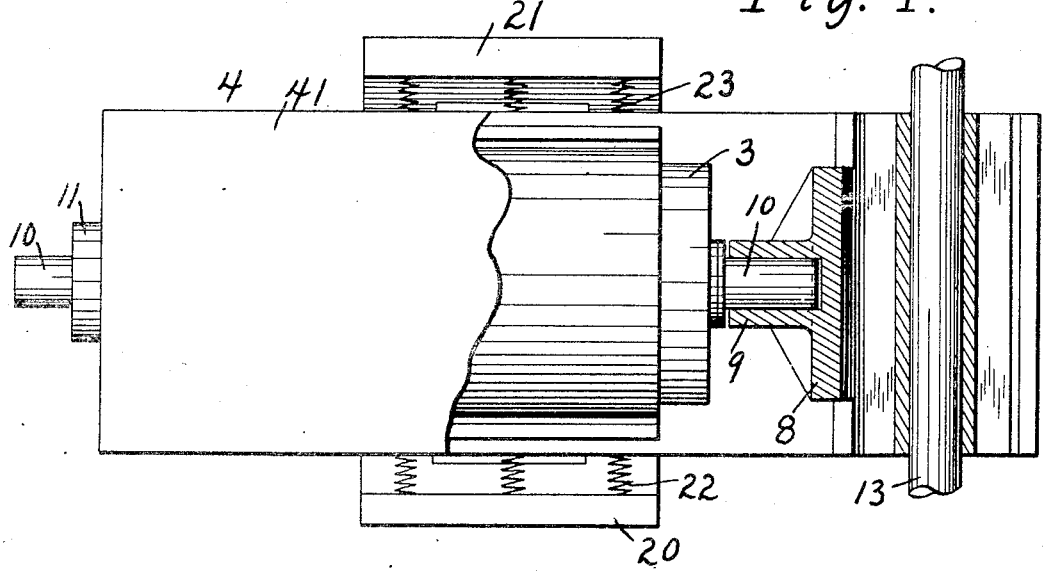
Fig. 4 is a top plan view partly broken away of the generator shown in Fig. 1.
Figure 6:
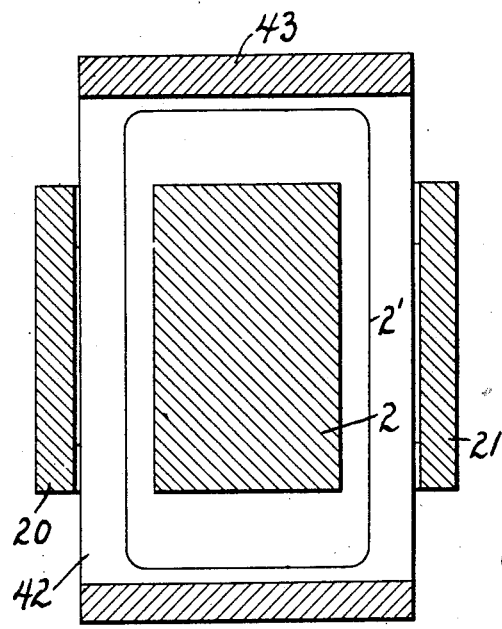
Fig. 6 is a horizontal sectional view on line 6—6 of Fig. 5.
Figure 5:
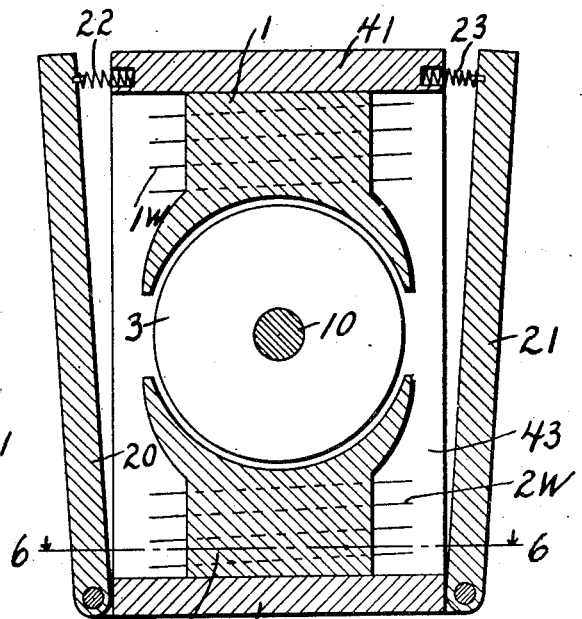
Fig. 5 is a vertical cross sectional view of generators shown in Figs. 1 and 2 on line 5—5.

The shape of the enclosed figure formed by the yoke 4 and the plate 8 may be varied as desired. In Fig. 1, the shape of this enclosed figure is substantially rectangular, while in Figs. 2 and 3, the middle part of the central portion 43 only is at right angles to the legs 41 and 42, the portions between this middle part and the legs being oblique and the portions 45 and 46 being also oblique. The shape of the pole pieces 6 and 7 may also be varied as desired. In Figs. 1, 2, and 3, these pole pieces are so formed that one is directly above the other, while in Fig. 7, the first pole piece extends further to the right than the second and the second extends further to the left.

In Fig. 7 is shown a double generator, each unit of which comprises a yoke 4 with pole pieces 1 and 2, the ends of the strips from which the yokes are formed being so constructed that the portions 45 and 46 of one yoke may be placed against the corresponding portion of the other yoke and secured in position in any suitable manner, the ends of each strip being so formed as to comprise one-half of the pole pieces 6 and 7. This construction forms a combined machine in which one of the main armatures may be used for starting and generating and the other for heating the usual coils for warming the interior of the automobile, the latter to be used only when needed.

It should be understood that in the use of the machine with motor vehicles, the main armature shaft will be operatively connected with the engine crankshaft so as to drive it in starting and be driven by it for generating. The other armature shaft may be operatively connected with the camshaft or crankshaft of the engine as may be desired.

It should be further understood that a multiplicity of poles may be arranged upon the main yoke coacting with the poles on the side plates as shown in Figs. 8 and 9, and an armature of comparatively large diameter may operate between all of these pole pieces. This kind of machine is particularly desirable for large engines of the multi-cylinder type using a comparatively high compression, as it will produce the highest possible starting efficiency and thereby avoid the rapid destruction of the battery. The bi-polar construction is intended for use with small engines of comparatively low compression such as are used in the smaller types of motor cars.

It should be understood that a machine made in accordance with my invention will have a higher general efficiency than the three separate and distinct dynamo-electric machines which have been used to operate an internal combustion engine of the automobile type. My machine is particularly desirable for starting the engine for the reason that any required portion of the volume of current circulating through the main armature when operating as a motor in starting the engine may be applied to the field coils of the alternating current side of the machine, thus producing temporarily a field of great magnetic strength which, through the medium of the inductor-armature, will produce a spark of great intensity; by producing this intense spark, the period of starting is greatly reduced and the life of the battery is greatly increased, while the volume of fuel drawn into the cylinders during the period of starting is considerably reduced.

It should also be understood that various changes in the details of construction may be made without departing from the principles set forth in this invention. I have not shown herein the electrical circuits used in controlling and regulating the voltage or volume of current, because any known controlling or regulating devices may be used in connection with my invention and any known methods of arranging the electrical circuits may be used.

Having thus described by invention, what I claim is:

1. In a dynamo-electric machine having oppositely arranged pole pieces, an armature arranged to rotate between said pole pieces, a yoke supporting the pole pieces formed of a single strip of magnetic metal having its mid portion extending at right angles to the axis of the armature and having an opening therein for one end of the armature shaft, having portions extending from its mid portion parallel with the axis of the armature and each carrying a pole piece, and having its end portions brought towards each other and shaped to form pole pieces and a second armature arranged between the pole pieces formed by the ends of the yoke strip.

2. In a dynamo-electric machine having oppositely arranged pole pieces, an armature arranged to rotate between said pole pieces, a yoke supporting the pole pieces formed of a single strip of magnetic metal having its mid portion extending at right angles to the axis of the armature and having an opening therein for one end of the armature shaft, having portions extending parallel with the axis of the armature and each carrying a pole piece and having its end portions brought towards each other and shaped to form pole pieces adapted to receive between them an armature rotating on an axis at right angles to the axis of the first mentioned armature.

3. In a dynamo-electric machine having oppositely arranged pole pieces and an armature arranged to rotate between them, a yoke having portions thereof extending parallel with the axis of the armature and having its ends brought towards each other and shaped to form pole pieces adapted to receive between them a second armature and side plates each hingedly connected to yoke portions carrying a pole piece and adapted to be swung into contact with the opposite yoke portion to close a magnetic circuit between the pole pieces.

4. In a dynamo-electric machine having oppositely arranged fixed pole pieces and an armature arranged to rotate between them, a yoke consisting of a strip of magnetic metal having opposite portions each formed to support one of the fixed pole pieces, side plates of magnetic metal movable towards and from said yoke portions to close and open a magnetic circuit between said yoke portions and a pole piece carried by each of said side plates adapted when the side plates are in closed position to form auxiliary pole pieces for the armature.

5. In a dynamo-electric machine having oppositely arranged pole pieces and an armature arranged to rotate between them, a yoke consisting of a single strip of magnetic metal having inwardly projecting pole pieces and arranged to form two field structures of different diameters, armatures of different diameters arranged to rotate in the said field structures, side plates of magnetic metal adapted to complete the magnetic circuit while the machine is operating as a motor and means for holding the said side plates out of contact with the said yoke while the machine is operating as a generator.

In testimony whereof I hereunto affix my signature.

PATRICK J. COLLINS.